United States Patent Office 3,350,339
Patented Oct. 31, 1967

3,350,339
PIGMENTED DISPERSION CONTAINING BINDER OF UNSATURATED OXIRANE, ETHYL ACRYLATE, METHYL METHACRYLATE EMULSION COPOLYMER
Kazys Sekmakas, Chicago, Ill., assignor to De Soto Inc., a corporation of Delaware
No Drawing. Filed Apr. 28, 1965, Ser. No. 451,620
4 Claims. (Cl. 260—29.6)

The present invention relates to film forming aqueous emulsions of copolymerized ethylenically unsaturated materials, which emulsions exhibit good adhesion to glossy or chalky surfaces and improved adhesion to surfaces previously coated with oil based paints, and the films formed from these emulsions exhibit improved water resistance. More particularly, the present invention relates to emulsions of fine particle size in which the dispersed particles of the emulsion are constituted by particles of emulsion copolymers of monoethylenically unsaturated materials, which contain aminated oxirane groups, ammoniated oxirane groups or both.

Aqueous emulsion or latex paints are presently in wide use since they are inexpensive, apply easily with water clean-up after application, and the coatings dry rapidly with minimum odor. Unfortunately, and as is known, latex paints are subject to important disadvantages which have limited their utility and detracted from their potential value. Thus, available latex paints do not adequately adhere to previously painted surfaces which are glossy or chalky. Also, the deposited film lack desirable water resistant properties and the film do not adequately adhere to surfaces previously painted with oil based paints.

In accordance with the present invention, these disadvantages are overcome by employing aqueous emulsion copolymers or interpolymers of polymerizable monoethylenically unsaturated materials which include a small proportion of aminated oxirane groups, ammoniated oxirane groups or both. The presence of the specified groups markedly alter the character of the aqueous emulsion copolymer to provide emulsion coating systems which exhibit good adhesion to glossy or chalky surfaces and improved adhesion to surfaces painted with oil based paints. Also, and despite water application, the deposited films resist water well, a most important achievement.

The term aqueous emulsion copolymer is used to denote copolymers produced by copolymerizing a liquid mixture of polymerizable monomers dispersed in aqueous medium in the form of finely divided particles of sufficient fineness (up to about 3 microns) to be stably dispersed in water. As is known, aqueous emulsion copolymers are of very high molecular weight and the invention is in no way related to copolymers of far lower molecular weight which may be produced by other polymerization techniques, such as suspension polymerization which produces polymer particles which are not stably suspended, solution polymerization or polymerization in bulk. Indeed, such copolymers are useless in the invention.

Referring more particularly to the present invention, 0.2–5% by weight based on the total weight of copolymerizable material of an oxirane containing monoethylenically unsaturated material is copolymerized in aqueous medium with at least one other monoethylenically unsaturated material, the oxirane groups of the copolymer being reacted with aminating and/or ammoniating agents to form the emulsion copolymers of the present invention. Apparently, the aminating and/or ammoniating agents react with the oxirane ring to cause the same to open, a hydrogen atom from the aminating or ammoniating agent combining with the oxygen atom to form a hydroxyl group, and the residue of the agent being directly attached to the remaining carbon atom of the oxirane ring.

The oxirane containing monoethylenically unsaturated material is a monomeric compound preferably illustrated by glycidyl acrylate or glycidyl methacrylate and mixtures thereof, though other monomers such as allyl glycidyl ether, glycidyl vinyl ether, and dipentene monoxide may also be used. The oxirane containing material is used in small amounts and preferably in the proportions of about 0.2–5% by weight, though up to about 15% may be tolerated. The oxirane material functions to provide, when ammoniated or aminated, the superior water resistance, wet adherence and adherence to glossy and oil painted surfaces which are the objectives of the invention. More preferably, the oxirane containing material is used in proportions of from 1–3% by weight.

The remainder of the copolymer consists essentially of at least one other monoethylenically unsaturated monomer, preferably one having no other functional group other than the $CH_2=C<$ group. The numerous materials which may be used either alone or in mixtures are illustrated by methyl acrylate, ethyl acrylate, methyl methacrylate, butyl acrylate, styrene, 2-ethylhexyl acrylate, vinyl toluene, vinyl acetate, acrylonitrile, vinylidene chloride, etc. Small proportions, up to 5% by weight, of materials having a functional group other than the ethylenic group such as acrylic acid, acrylamide, methylol acrylamide, aminoacrylates or hydroxyethyl acrylate may also be present but, and with the exception of up to about 5% of unsaturated acid, monomers supplying other functional groups should be limited to amounts less than 3% by weight.

It is preferred that the monomers be selected to provide a copolymer having a glass transition temperature below room temperature so that the copolymer particles will coalesce by themselves without the necessity of applying external heat. However, the monomers can be selected to provide a copolymer having a higher glass transition temperature and higher boiling water miscible solvents may be used as taught in Sanderson Patent 3,032,521. Water immiscible solvents, such as butyl Cellosolve acetate, can also be used.

While the present invention primarily contemplates aqueous emulsions which will provide flat-appearing coatings, a degree of surface gloss may be provided as taught in my copending application Ser. No. 440,628, filed Mar. 17, 1965.

The emulsion copolymers of monoethylenically unsaturated monomers and oxirane containing unsaturated monomers are preferably copolymerized using a procedure which will produce fine particle size emulsions. Preferred particle size is from .05 to 1 micron, though from .01 to 3 microns is broadly contemplated. These fine particle size latex emulsions are prepared by incrementally adding the unsaturated copolymerizable material to a water solution which has dispersed therein surface active agents. The addition is made under conditions conducive to addition copolymerization so that copolymerization takes place as the materials are added thus allowing for the formation of fine particle size emulsions. To allow copolymerization to take place as the unsaturated copolymerizable materials are added to the emulsion, it is desirable that polymerization catalyst be present in the water phase of the emulsion as the unsaturated copolymerizable materials are added thereto. It is understood that this is not essential though it is preferred, and that the polymerization catalyst can be in admixture with the unsaturated copolymerizable materials as they are added to the emulsion or the catalyst can be added to the water phase as polymerization proceeds.

The polymerization catalysts which may be used in accordance with the invention can be of the water soluble type such as potassium persulfate, ammonium persulfate and hydrogen peroxide, or of the monomer soluble, water-insoluble type such as benzoyl peroxide, cumene hydroperoxide and methyl ketone peroxide as desired. Preferably, the water-soluble catalysts are used as the monomer soluble type tend to produce large particle size emulsions. A combination of the water-soluble and monomer soluble catalysts may also be used.

When the polymerization catalysts of the persulfate type are used, they decompose resulting in acidic products. It is preferred to buffer the system to maintain the pH in the range of from 4.0–6.0 during polymerization with materials such as sodium bicarbonate, etc.

The emulsion copolymer is prepared without the use of a film-forming emulsifying agent such as a water soluble alkyd. Instead, emulsification is maintained with an anionic surface active agent, preferably in combination with a non-ionic surface active agent. In the examples set forth hereinafter, the anionic agent is sodium lauryl sulfate and the non-ionic agent is nonyl phenyl polyethylene glycol ether containing about 10 ethylene oxide groups per molecule. While these specific agents are preferred, other anionic agents are illustrated by sodium dioctyl sulfosuccinate and sodium octylphenoxy polypropylene oxide sulfonate containing about 20 propylene oxide groups per molecule. Appropriate anionic commercial compositions are Triton X-200 and Duponol ME. Other non-ionic agents are illustrated by octyl phenoxy polyoxypropylene ethanol. Appropriate non-ionic commercial compositions are Triton X-100, Igepal CO-613, Tergitol NFX and Tergitol NP-14. The anionic surface active agent when used alone is preferably added in amounts of from 0.5% to 3% by weight, based on the total weight of the emulsion product produced in accordance with the invention. When the anionic surface active agent is used in combination with the non-ionic surface active agent, it is preferably added in amounts of from 0.5% to 2% by weight. The non-ionic surface active agent is preferably used in amounts of from 1% to 4% by weight.

The emulsion copolymer of the present invention contains ammoniated oxirane groups, aminated oxirane groups or both. This ammoniation or amination reaction provides an emulsion coating composition which exhibits the improved properties discussed hereinbefore. As will be evident from the examples which are set forth hereinafter, this reaction is essential since, in its absence, the emulsion coating composition exhibits poor wet adhesion properties and is water sensitive.

The amination or ammoniation reaction is preferably conducted after copolymerization, though less desirably the oxirane containing material may be aminated or ammoniated prior to copolymerization.

The agents which may be used in the ammoniating or aminating reaction are preferably ammonium hydroxide or simple aliphatic primary and secondary monoamines such as 1 to 4 carbon atom alkyl and alkanol amines such as monoethanol amine. Both agents are preferably used in water solution. Ammonium hydroxide is particularly preferred because it is relatively inexpensive. Ammonia may also be used but this is less desirable. Other monoamines which may also be used are illustrated by tertiary butyl amine, ethyl amine, tertiary octyl amine, diethanolamine, dimethyl amine, methyl ethyl amine, etc. While mixtures of these agents may be used, it is preferred to use one for ease of production.

As would be evident, the ammoniating reaction with ammonium hydroxide is preferably conducted at room temperature so as not to cause extensive generation of ammonia.

The ammoniating and aminating agents are preferably used in sufficient proportion to cause ammoniation or amination of substantially all the oxirane groups carried by the oxirane containing material.

The invention is illustrated in the examples which follow in which all parts are by weight.

In all of the following examples, the following polymerization procedure is used:

POLYMERIZATION PROCEDURE

A polymerization reactor is provided equipped with an agitator, a reflux condenser, a thermometer, an inlet for nitrogen and a separatory funnel for adding monomeric materials.

(1) To the reaction kettle, add water, anionic surfactant (sodium lauryl sulfate) and nonionic surfactant (nonyl phenoxy polyethylene ethanol), buffer (sodium bicarbonate) and potassium persulfate catalyst.

(2) Pass a slow stream of nitrogen into the kettle to displace air and begin agitation and heating. Heat to 170° F.

(3) Combine the monomers and add slowly from the addition funnel over 2–2½ hours keeping the temperature at 170–175° F. When the monomer addition is complete hold the temperature at 170° F. for about one hour, so that reaction will go to completion.

(4) Cool the product to room temperature while stirring.

(5) Add ammonium hydroxide or amine solution to emulsion to adjust pH to 8.5–10.5.

PREPARATION OF EMULSION COPOLYMERS

The following examples show the critical nature of the composition of the emulsion polymers in which Example 1 contains glycidyl methacrylate and Example 2 replaces the same with methacrylic acid.

INGREDIENTS IN PARTS BY WEIGHT

| | Example 1 | Example 2 |
|---|---|---|
| Aqueous (initial charge): | | |
| Water | 1,150 | 1,150 |
| Sodium lauryl sulfate | 8 | 8 |
| Nonylphenoxy polyethylene ethanol | 24 | 24 |
| Sodium bicarbonate | 1 | 1 |
| Potassium persulfate | 3 | 3 |
| Monomer composition: | | |
| Ethyl acrylate | 640 | 640 |
| Methyl methacrylate | 310 | 310 |
| Glycidyl methacrylate | 20 | |
| Glacial methacrylic acid | | 20 |
| Ammonium hydroxide (28%) | 30 | 30 |
| The final characteristics of emulsion copolymers: | | |
| Solids (percent) | 45.3 | 45.5 |
| Viscosity (centipoises—Brookfield) | 50 | 280 |
| pH | 9.8 | 9.5 |
| Consistency | Smooth | Smooth |

*Method of testing emulsion polymers with respect to the properties of wet adhesion and moisture sensitivity*

PROCEDURE (1) Incorporate polymers into pigment dispersion slurrys by mixing appropriate amounts of thickened slurry with the polymers of Examples 1 and 2.

(2) Brush one coat of the paints so formed on a small area of weathered trim paint panels and allow 24 hours cure at room temperature.

(3) Soak the test panels thoroughly in distilled water. Cover with watch glass or a sheet of polyethylene to retard evaporation of the water. Inspect every hour or two to insure thorough soaking.

(4) After a period of from 3 to 6 hours, inspect the film as follows:
   (a) Examine for blistering or wrinkling.
   (b) Rub film lightly with finger (not finger nail) to determine if the film has lost adhesion.
   (c) Rub film vigorously with finger if it withstands light abrasion.

Each polymer was incorporated into a pigment dispersion slurry and brushed out over a weathered (6 months) old trim paint panel. Paints made with the product of Example 1 soften when wet, but do not lose adhesion, while the acid containing product of Example 2 loses adhesion and blisters and can be rubbed off very easily from a glossy trim substrate after one hour of water soaking.

The following two examples demonstrate the importance of the formation of ammoniated or aminated residue of glycidyl acrylate.

INGREDIENTS IN PARTS BY WEIGHT

|  | Example 3 | Example 4 |
|---|---|---|
| Aqueous (initial charge): |  |  |
| Water | 1,020 | 1,020 |
| Anionic surface active agent (35% active) | 100 | 100 |
| Non-ionic surface active agent | 30 | 30 |
| Sodium bicarbonate | 1 | 1 |
| Potassium persulfate | 3 | 3 |
| Monomer composition: |  |  |
| Ethyl acrylate | 640 | 640 |
| Methyl methacrylate | 310 | 310 |
| Glycidyl methacrylate | 15 | 15 |
| Ammonium hydroxide (28%) | 30 |  |
| The final characteristics of emulsions: |  |  |
| Solids (percent) | 46.9 | 46.8 |
| pH | 9.8 | 7.3 |
| Viscosity (Brookfield-centipoise) | 350 | 295 |
| Consistency | Smooth | Smooth |

The emulsions of Examples 3 and 4 were evaluated in the standard wet adhesion and water resistance tests. The copolymer of Example 4 blistered and failed water soaking test after 2 hours, while a paint made with the copolymer of Example 3 passed 16 hours water soak test and did not blister at all.

Thus, adhesion and water resistance of the ammoniated copolymer of Example 3 when applied over oil based paint under wet conditions is much superior to the copolymer of Example 4.

PREPARATION OF STYRENE-ACRYLIC EMULSION CONTAINING GLYCIDYL METHACRYLATE AND COMPARISON OF SAME WITH A COMPOSITION CONTAINING ACRYLIC ACID IN PLACE OF THE GLYCIDYL METHACRYLATE

[Ingredients in parts by weight]

|  | Example 5 | Example 6 |
|---|---|---|
| Aqueous (initial charge): |  |  |
| Water | 1,020 | 1,020 |
| Anionic emulsifier (35% active) | 150 | 150 |
| Sodium bicarbonate | 1 | 1 |
| Potassium persulfate | 3 | 3 |
| Monomer composition: |  |  |
| Styrene | 310 | 310 |
| Ethyl acrylate | 640 | 640 |
| Glycidyl methacrylate | 15 |  |
| Ammonium hydroxide (28% solution) | 30 |  |
| Glacial methacrylic acid |  | 15 |
| The final characteristics of emulsions: |  |  |
| Solids (percent) | 46.0 | 45.1 |
| Viscosity (centipoise) | 1,300 | 3,500 |
| pH | 10.0 | 9.1 |
| Consistency | Smooth | Smooth |

The styrene emulsion copolymer of Example 6 containing glacial methacrylic acid has poor water resistance after 2 hours of water soaking, paint film blistered badly and could be removed from an oil painted substrate very easily. The product of Example 5 exhibited excellent results.

PREPARATION OF AMINATED EMULSION COPOLYMERS IN THE PRESENCE AND ABSENCE OF GLYCIDYL METHACRYLATE

[Ingredients in parts by weight]

|  | Example 7 | Example 8 |
|---|---|---|
| Aqueous (initial charge): |  |  |
| Water | 1,020 | 1,020 |
| Anionic emulsifier (35% active) | 150 | 150 |
| Sodium bicarbonate | 1 | 1 |
| Potassium persulfate | 3 | 3 |
| Monomer composition: |  |  |
| Ethyl acrylate | 640 | 640 |
| Methyl methacrylate | 310 | 310 |
| Glycidyl methacrylate | 20 |  |
| Monoethanolamine | 30 | 30 |
| Final characteristics of emulsion were: |  |  |
| Solids (percent) | 46.4 | 46.1 |
| Viscosity (centipoise) | 1,140 | 890 |
| pH | 10.0 | 9.9 |
| Consistency | Smooth | Smooth |

The emulsion of Example 7 has excellent wet adhesion, water resistance and non-blistering properties. The emulsion of Example 8 containing no glycidyl methacrylate is very water sensitive and has poor wet adhesion properties. After 2 hours of water immersion, a film formed from the emulsion of Example 8 blistered badly and the film could be easily peeled off from the substrate.

It can be seen from the foregoing examples that emulsion copolymers containing ammoniated or aminated glycidyl acrylates or methacrylates provide a coating composition having superior properties, which properties are not obtainable in the absence of the ammoniation or amination reaction, the glycidyl acrylate or methacrylate or both.

While the capacity of the ammoniated or aminated glycidyl monomer to function to provide improved water resistance has been demonstrated, the results are not subject to any ready explanation and no theories are advanced.

The anionic emulsifier used in Examples 3, 4, 5 and 6 is a commercially available product sold by Alcolac Chemical Corporation under the tradename Abex 18S. The same results are obtained using sodium lauryl sulfate in an amount of 35% by weight of the Abex 18S product used in said examples.

It will be understood that the invention is illustrated, but not limited by the specific examples presented hereinbefore. It will also be evident that the products of the invention are primarily useful in the coating art and as such they may be pigmented, or contain dyes and various other components as will be evident to those skilled in the art.

The invention is defined in the claims which follow in which the language "oxirane containing copolymerizable monoethylenically unsaturated material including in the oxirane ring (or glycidyl group) an alkaline reacting nitrogen-containing radical which comprises the residue of a member selected from the group consisting of ammoniating agent, aminating agent and mixtures thereof" is intended to embrace the situations in which ammoniation and/or amination is accomplished before copolymerization, during copolymerization or after copolymerization.

I claim:
1. A water based air drying paint comprising a pigmented copolymer emulsion of fine particle size exhibiting good adhesion to glossy and oil painted surfaces which comprises dispersed particles of an emulsion copolymer of:
   (1) from 0.2–3% by weight, based on the total weight of copolymerizable material, of an oxirane containing copolymerizable monoethylenically unsaturated material including in the oxirane ring an alkaline reacting nitrogen-containing radical which comprises the residue of a member selected from the group consisting of ammoniating agent, aminating agent, and mixtures thereof; and (2) the remainder of the copolymer consisting essentially of ethyl acrylate and methyl methacrylate in weight proportions of about 2:1 to provide copolymer particles which will coalesce at room temperature as the water phase of said emulsion evaporates.

2. An air drying paint as recited in claim 1 in which said component (2) contains less than 3% based on the total weight of copolymerizable materials of material containing functional groups other than the single ethylenic group.

3. An air drying paint as recited in claim 1 in which said oxirane containing material is glycidyl methacrylate.

4. An air drying paint as recited in claim 1 in which said alkaline reacting nitrogen-containing radical is the residue of ammonium hydroxide.

References Cited

UNITED STATES PATENTS

| | | | |
|---|---|---|---|
| 2,580,901 | 1/1952 | Erickson et al. | 260—80.5 |
| 2,949,445 | 8/1960 | Blake | 260—80.5 |
| 2,988,524 | 6/1961 | Fitch | 260—80.5 |
| 3,206,421 | 9/1965 | Victorius | 260—29.6 |
| 3,242,123 | 3/1966 | Mayfield et al. | 260—29.6 |

SAMUEL H. BLECH, *Primary Examiner.*

MURRAY TILLMAN, *Examiner.*

W. J. BRIGGS, *Assistant Examiner.*